(12) United States Patent
Solleder et al.

(10) Patent No.: US 6,307,725 B1
(45) Date of Patent: Oct. 23, 2001

(54) FAULT-CURRENT PROTECTIVE SWITCHGEAR

(75) Inventors: Reinhard Solleder, Lappersdorf; Reinhard Schmid, Regensburg; Manfred Kleemeier, Neutraubling; Fritz Pohl, Hemhofen, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/485,796

(22) PCT Filed: Aug. 7, 1998

(86) PCT No.: PCT/DE98/02274

§ 371 Date: Feb. 14, 2000

§ 102(e) Date: Feb. 14, 2000

(87) PCT Pub. No.: WO99/09630

PCT Pub. Date: Feb. 25, 1999

(30) Foreign Application Priority Data

Aug. 20, 1997 (DE) ................................................ 197 36 220

(51) Int. Cl.⁷ ............................................................. H02H 3/00
(52) U.S. Cl. ........................... 361/93.6; 361/44; 361/78; 361/87
(58) Field of Search ................................ 361/78, 87, 93.1, 361/93.6, 42, 44; 324/424, 537

(56) References Cited

U.S. PATENT DOCUMENTS

| 4,663,690 | * | 5/1987 | Bonnian et al. | 361/44 |
| 4,725,913 | * | 2/1988 | Dhar | 361/44 |
| 5,737,167 | * | 4/1998 | Bachl | 361/79 |

FOREIGN PATENT DOCUMENTS

| 37 18 183 | 12/1988 | (DE) . |
| 38 23 099 | 1/1990 | (DE) . |
| 41 12 169 | 10/1992 | (DE) . |
| 195 28 020 | 2/1997 | (DE) . |
| 0 440 835 | 8/1991 | (EP) . |
| 0 702 445 | 3/1996 | (EP) . |

OTHER PUBLICATIONS

Solleder, Reinhard, "Warum Fehlerstrom—Schutzschalter mit netzspannungsunabhängiger Auslösung?", etz, vol. 107, Issue 20, pp. 938–948 (1986). Described in Specification (No Month).

Holzer, Von Willhelm, "Fehlerstrom—Schutzschalter fur selektives Abschalten" Siemens Zeitschrift 42, No. 6, pp. 492–494 (*1968). Translation provided. (No Month).

* cited by examiner

Primary Examiner—Michael J. Sherry

(57) ABSTRACT

A residual current device includes a residual current tripping circuit for actuating a release, and an additional monitoring device for checking the release, in which case a device is provided for electrically decoupling the residual current tripping circuit from the monitoring device.

2 Claims, 1 Drawing Sheet

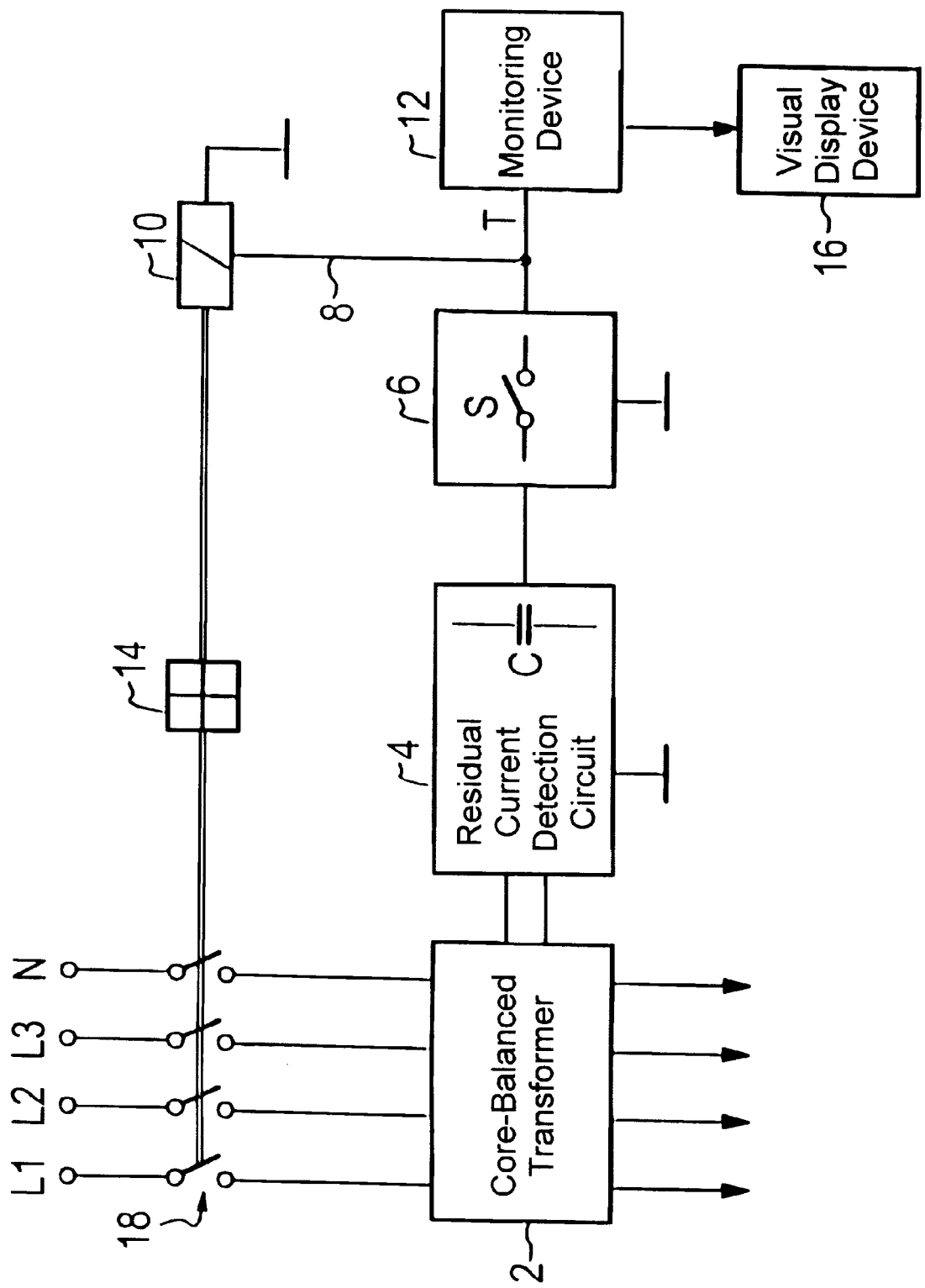

FAULT-CURRENT PROTECTIVE SWITCHGEAR

FIELD OF THE INVENTION

The present invention relates to a residual current device.

BACKGROUND INFORMATION

A residual current device (RCD) is used to ensure protection against a dangerous body current in an electrical system. This occurs, for example, if somebody touches a live part of an electrical system. The fault current then flows away to ground via the person, as a body current. The residual current devices, which are used for protection against dangerous body currents, reliably and quickly isolate the electrical system from the mains voltage when the so-called rated fault current is exceeded.

A residual current device is described, for example, in the article "Warum Fehlerstrom-Schutzschalter mit netzspannungsunabhäniger Auslösung?," etz, Volume 107 (1986), Issue 20, pages 938 to 945. Outline circuit diagrams and principles of operation of a residual current device are described there, in particular in FIGS. 1 to 3. In this case, a distinction is drawn between two different basic types. Residual current devices take the energy required for tripping from the fault current itself, irrespective of the mains voltage. On the other hand, differential-current devices are fault current protection devices in which the auxiliary electrical energy required for the tripping process is taken from the mains voltage. Such a differential-current switch therefore requires a mains connection and a power supply unit to operate it, with the power supply unit converting the mains voltage to the supply voltage that is required to operate its components.

Residual current devices are subject to stringent requirements relating to safety and reliability. For example, the Berufsgenossenschaft der Feinmechanik und Elektrotechnik [German Professional Society for Fine Instrumentation and Electrical Engineering] have imposed the requirement, based on IEC 1508, for residual current devices that trip independently of the mains voltage to be checked for simple faults by means of electronic testing. During this check, a test pulse is applied to a release connected to a switch, as a rule to the tripping coil of a tripping relay, and the reaction of the system is checked. If failures are identified in the system, then the system is switched off permanently.

The test signals applied to the control line of the release by the monitoring device in order to check the release may, however, be deformed by the residual current detection circuit, which is likewise connected to the control line, and by natural dissipation currents that exist in the electrical system and are transmitted to the secondary of the core-balanced transformer. If, for example, there is already a high operating fault current or dissipation current which, however, is less than the rated fault current and is not on its own sufficient to trip the release, then the test signal or the test pulse is superimposed on the control current (fault current signal) for the release, the control current being generated from the fault current in the residual current detection circuit. During testing, a brief control current (test pulse) is also produced for the release which, in the case of superimposition, is considerably greater than the nominaltor threshold-value current required for tripping. Thus, it is thus possible during testing for the release to respond because the residual current signal and the test pulse in the tripping relay are disadvantageously superimposed. This leads to fault tripping of intrinsically serviceable residual current devices.

An object of the present invention is to provide a residual current device in which the release in a residual current device can be safely and reproducibly checked and monitored in order to achieve high operational reliability.

A present residual current device according to the invention contains a residual current detection circuit for activating a release, and a monitoring device, which is additionally connected to it, for checking the release, in which case means are provided for electrically decoupling the residual current detection circuit from the monitoring device. This measure ensures that the test signals passed on from the monitoring device to the release are not influenced by the respectively connected residual current detection circuit and are independent of any dissipation current flowing at that time in the electrical system, thus ensuring a very high level of operational reliability for the electrical checking of the release.

The present invention may be used for all known types of tripping relay and residual current detection circuits, for example selective, short-term delayed or frequency-independent residual current detection circuits.

A decoupling circuit having a threshold-value switch is preferably provided for electrical decoupling. This measure ensures that the residual current detection circuit does not emit any electrical control signals to the control line leading to the release until a predetermined tripping criterion is satisfied. In other words, operational dissipation currents below the rated residual current do not produce any control signals on the control line leading to the release. The control signals can be superimposed on the test signals emitted to the control line from the monitoring device, and can deform these test signals. The checking of the release is thus not influenced by the present status of the electrical system, provided the tripping condition is not satisfied in the residual current detection circuit.

BRIEF DESCRIPTION OF THE DRAWING

The FIGURE shows a block diagram of a fault current device according to the present invention.

DETAILED DESCRIPTION

According to FIG. 1, a polyphase mains system L1, L2, L3, N has a core-balanced transformer 2 associated with it, downstream of which a residual current detection circuit 4 is arranged, in which the voltage signal produced in a secondary winding on the core-balanced transformer 2 is rectified, and is stored in a capacitor C. The residual current detection circuit 4 has a decoupling circuit 6 connected downstream of it, which contains a threshold-value switch S as is described, for example, in European Patent No. 0 702 445. The threshold-value switch S does not pass the energy stored in the energy-storage capacitor C via a control line 8 to a release 10, for example a tripping relay, unless this stored energy is greater than a predetermined value.

The residual current detection circuit 4 is thus electrically decoupled or isolated from the control line 8 provided the dissipation current or residual current flowing in the electrical system does not satisfy the tripping condition required to close the threshold-value switch S.

A monitoring device 12 is connected in addition to the residual current detection circuit 4, and is supplied with voltage from a power supply unit, which is not illustrated in the figure. One signal output of the monitoring device 12 is connected to the control line 8, which leads from the residual current detection circuit 4 to the release 10, and generates at the signal output test pulses or test signals T which are output to the control line, and by means of which the serviceability of the release 10 is checked.

The decoupling circuit 6 thus ensures that the test pulses T generated by the monitoring device 12 and passed to the control line 8 remain uninfluenced by the internal circuitry of the residual current detection circuit 4, on the one hand, and by the present dissipation current flowing in the electrical system, provided the latter does not satisfy the required tripping condition for the threshold-value switch S. The release 10 is mechanically coupled to a switch mechanism 14, which acts on a contact system 18 If a test pulse T, which is passed from the monitoring device 12 to the control line 8, does not lead to the release 10 responding correctly, then, for example, a visual defect indication is produced in a visual display device 16.

What is claimed is:

1. A residual current device comprising:
   a control wire;
   a release;
   a residual-current detection circuit actuating the release via the control wire; and
   a decoupling device electrically decoupling the residual current detection circuit from the control line so that the residual current detection circuit does not emit any electrical control signals to the control line leading to the release until a predefined tripping criteria is satisfied.

2. The residual current device according to claim 1, wherein the decoupling device includes a threshold-value switch for electrical decoupling.

* * * * *